April 6, 1965     D. OGNE     3,176,717
NEUTER COUPLING WITH POPPET VALVES
Filed Feb. 27, 1963     2 Sheets-Sheet 1
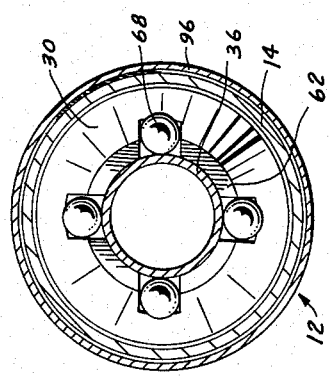
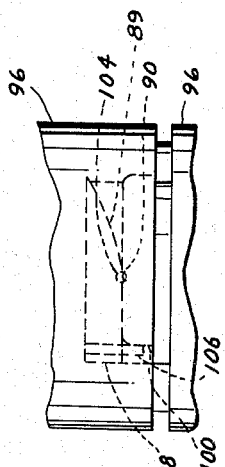
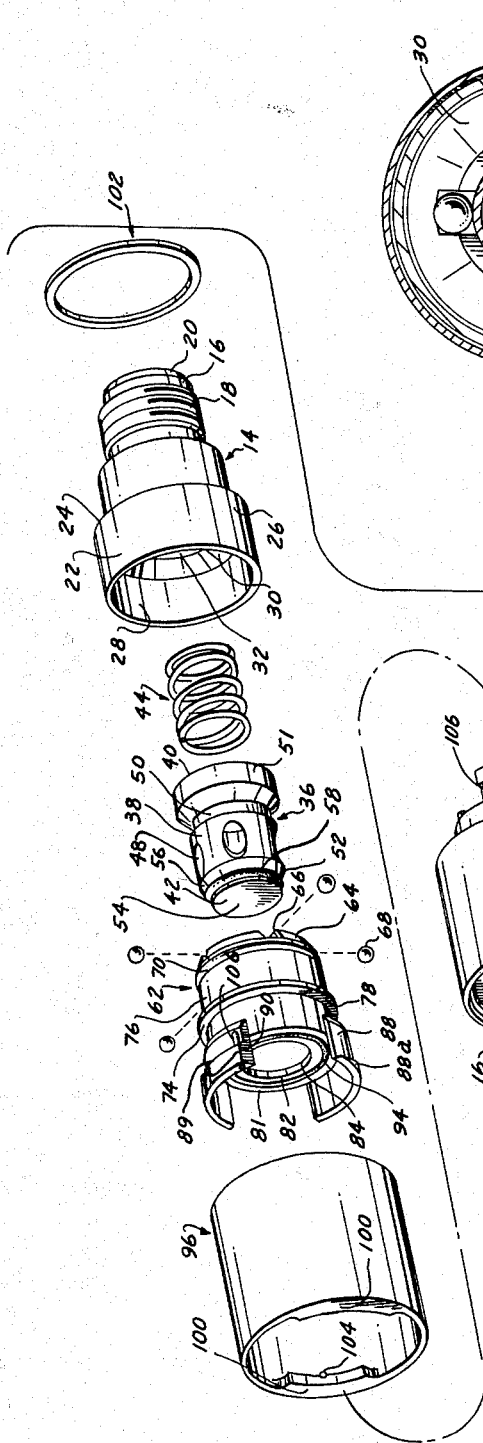
INVENTOR.
DAVID OGNE
BY
ATTORNEY April 6, 1965  D. OGNE  3,176,717
NEUTER COUPLING WITH POPPET VALVES
Filed Feb. 27, 1963  2 Sheets-Sheet 2
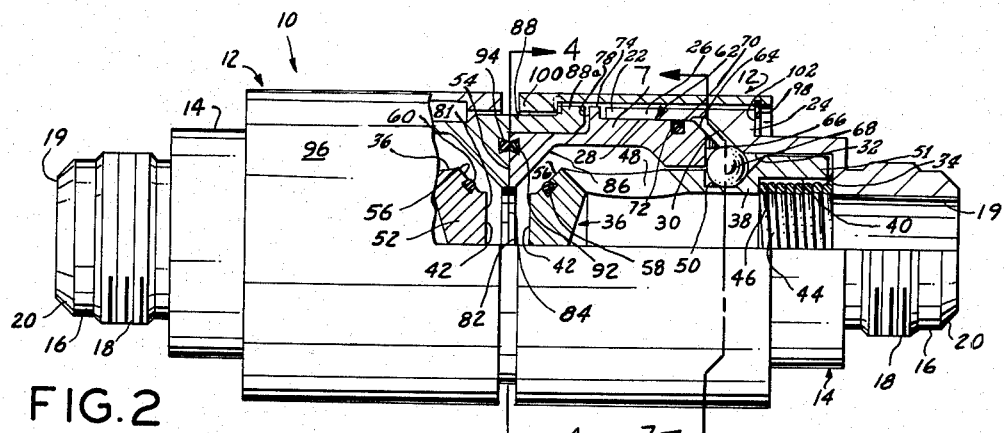
FIG. 2
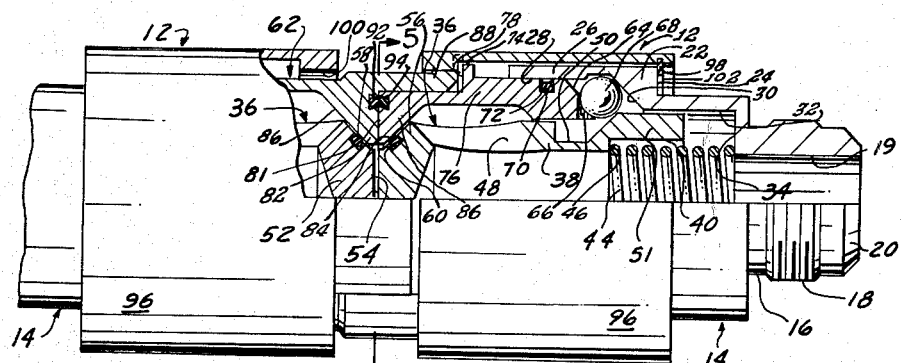
FIG. 3
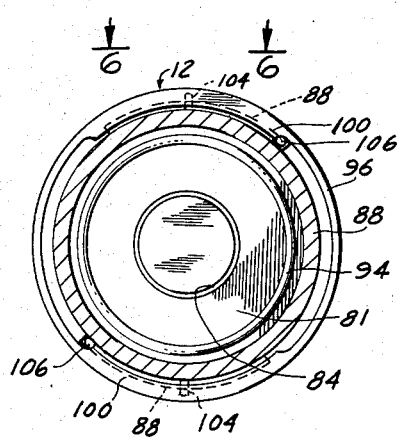
FIG. 4
FIG. 5
INVENTOR.
DAVID OGNE
BY R. E. Geaugue
ATTORNEY

United States Patent Office 3,176,717
Patented Apr. 6, 1965

3,176,717
NEUTER COUPLING WITH POPPET VALVES
David Ogne, Northridge, Calif., assignor to Raymond G. Koger, doing business as Cliffko Manufacturing Company, Chatsworth, Calif.
Filed Feb. 27, 1963, Ser. No. 261,394
9 Claims. (Cl. 137—614.02)

This invention relates to neuter couplings and more particularly to neuter couplings having poppet shut-off valves which eliminate leakage, spillage and air inclusion when pressurized lines are connected or disconnected.

It has long been a problem to satisfactorily connect and disconnect pressurized hoses and other conduits without spillage, leakage or air inclusion during the connecting and disconnecting operations.

Also, when long lengths of hose, tube or pipe are provided with a male coupling at one end and a female coupling att he other, it often develops that when various sections are to be connected together in the field the wrong end of one section will be brought into position to be connected with the end of another section. This results in great inconvenience in having to turn one of the long sections end-for-end before it can be connected to the other section.

Neuter couplings have been suggested and have been generally satisfactory; however, they do have certain disadvantages. The major disadvantage resides in the fact that they are rather difficult to connect together because they have to be brought into precise alignment before the connecting parts can be locked together. Another disadvantage resides in the fact that it is rather difficult to provide such couplings with sealing means which will be effective to seal gases and liquids operating under high pressure. Yet another disadvantage resides in the fact that such couplings cannot be connected together when the lines to which they are attached are pressurized.

In view of the foregoing factors and conditions characteristic of couplings for joining together sections of pressurized hose, tube or pipe, it is the primary object of the present invention to provide a new and improved neuter coupling not subject to the disadvantages enumerated above, which has a positive sealing means, which has self-aligning, identical mating halves that may be readily joined together in effective sealing relationship without the use of wrenches, and which may be used to join pressurized hoses together without spillage, leakage or air inclusion.

Another object of the present invention is to provide a neuter coupling having improved poppet shut-off valves which trap fluid in a pressurized, disconnected hose, and which may be employed as a shut-off valve when two couplings are connected together.

Yet another object of the present invention is to provide a neuter coupling for use on pressurized lines wherein the coupling halves can be brought together in face sealing relationship whereby air is excluded when upon further engagement of a locking sleeve, a poppet valve is unseated permitting flow through the coupling in a pressurized line.

A further object of the present invention is to provide a neuter coupling having improved poppet shut-off valves which are arranged in such a manner that when coupling halves are separated the poppets in the respective halves will seal off each half before the face sealing relationship is broken, whether or not there is pressure in the line.

A still further object of the present invention is to provide a neuter coupling having poppet shut-off valves wherein the poppet face is sealed off and flush with the coupling face when the two coupling halves are mated and before they are separated.

According to the present invention, a coupling is provided having identical coupling halves each incorporating an outer body portion, an inner body portion, a locking sleeve, a poppet valve, and means including balls for automatically seating and unseating the valves when the coupling halves are disconnected and connected, respectively. Each inner body portion has two protruding segments which may be machined with a cam locking device so that, when the coupling halves are brought together, face seals provided on the face of each coupling half become squeezed together. Further engagement of the locking sleeve on the segment cam causes an inner body portion and a poppet valve to move in the direction of the end fitting. This causes the balls to move towards the center line of the coupling thereby moving the poppet at a faster rate than the movement of the inner body portion. Hence, the poppet has moved away from its sealing relationship with the inner body portion. When the locking sleeve is fully engaged on the segment of an opposing coupling half, the two halves will become locked together and spring loaded in the locked position. The coupling is self-energizing due to the fact that when line pressure is applied it will cause the seals to become more tightly squeezed together and will cause the lock to be even more effective. Before two coupling halves are brought together, the body sealing face and the poppet face are flush, thereby allowing no air inclusion into the line. Also, upon disassembly of two coupling halves the body and poppet faces are flush thereby permitting no spillage upon separation of the two coupling halves. When the coupling halves are separated, the poppet valves in the respective halves seal off each half, whether or not there is pressure in the line. Releasing one locking sleeve seats one of the valves to shut-off flow through the line while the other locking sleeve maintains the structural connection of the coupling. This permits using the coupling as a shut-off valve even though the two halves remain coupled together.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of a coupling of the present invention showing the individual parts in exploded relation;

FIGURE 2 is an elevational view with parts shown in cross section of a coupling of the present invention shown in mating, locked relation with the poppet valves open;

FIGURE 3 is an elevational view similar to FIGURE 1 with the parts shown in mating, unlocked relation with the poppet valves closed;

FIGURE 4 is a transverse cross-sectional view taken along line 4—4 of FIGURE 2;

FIGURE 5 is a transverse cross-sectional view taken along line 5—5 of FIGURE 3;

FIGURE 6 is a partial plan view taken along line 6—6 of FIGURE 4; and

FIGURE 7 is a transverse cross-sectional view taken along line 7—7 of FIGURE 2.

Referring again to the drawings, the coupling of the present invention, generally designated 10 (FIGURE 2) comprises identical coupling halves 12. Each coupling half 12 includes an outer body member 14 having a first end 16 of reduced diameter carrying an external thread 18, a fluid inlet port 19, and a tapered portion 20 adapting the coupling half 12 to be connected to standard flared tubing. Of course, it is obvious that first end 16 may be provided with standard pipe thread or any other suitable connecting means. The outer body member 14 also includes a second end 22 of enlarged diameter forming an external shoulder 24. The second end 22 includes an encompassing side wall 26 forming a first cylindrical chamber 28 which has a chamfered, open bottom constituting a cam 30. The first chamber 28 communicates with a second chamber 32 of reduced diameter which forms an internal, annulal shoulder 34 with first end 16.

A poppet valve member 36, which includes an encompassing side wall 38, an open end 40 and a closed end 42, is slidably mounted in the outer body member 14. The poppet valve 36 is biased away from the first end 16 by means of a compression spring 44 having one end seated on shoulder 34 and its other end seated on an internal, annular shoulder 46 formed in open end 40 of valve 36. A plurality of fluid outlet ports 48 are spaced about the periphery of the side wall 38 of valve 36 and a ball receiving groove 50 encompasses side wall 38 adjacent a cylindrical skirt 51 forming the open end 40. The skirt 51 is disposed within the second chamber 32 of the outer body member 14 forming a sliding contact therewith. A valve 52 having a flat face 54 and a sloping shoulder 56 forms the closed end 42 of valve member 36. An O-ring 58 is mounted in a groove 60 formed on the sloping shoulder 56.

An inner body member 62 encompasses the poppet valve member 36 and is slidably mounted in the first cylindrical chamber 28 of outer body member 14. The inner body member 62 includes a tapered end 64 in which ball receiving slots 66 are located for receiving balls 68. An O-ring 70 is mounted in a groove 72 adjacent the tapered end 64 and forms a sealed, sliding contact with the side wall 26 of chamber 28. An external annular shoulder 74 is formed on the encompassing side wall 76 of the inner body member 62 intermediate its ends and forms a flat, annular face 78 at the juncture of shoulder 74 and a reduced diameter of side wall 76. The end 81 of inner body member 62 which is remote from its tapered end 64 includes an annular disc 82 having an aperture 84 which accommodates flat face 54 so that the end 42 of valve 36 will be flush with end 81 when O-ring 58 is seated on a valve seat 86 formed on the inner surface of disc 82. A pair of segments 88 partially encompasses the end 81 in such a manner that, when two coupling halves 12 are brought together in mating relation, the segments 88 will form a continuous cylindrical side wall. Each segment 88 includes a cam 88a having a sloping face 89 which is provided with a detent receiving slot 90. A groove 92 is formed on the outer face of disc 82 and has sloping walls which hold an O-ring 94 captive. The O-ring 94 is protected from damage by the protruding segments 88 when the coupling halves are disconnected and are completely trapped when the halves are conected together.

A cylindrical sleeve 96 encompasses the outer body member 14 and the inner body member 62 and includes a groove 98 at one end and spaced cams 100 at its other end. A snap ring 102 is mounted in groove 98 and engages shoulder 24 on outer body member 14 to maintain the individual parts of each coupling half in assembled relation by cooperating with spaced cams 100 which bear against face 78 of inner body member 62 by virtue of the basis imparted by spring 44 when a respective coupling half remains unassembled with its mating half.

A pin 104 is mounted on each cam 100 and is engageable with a respective detent engaging slot 90 on a segment 88 of an opposite coupling half 12 when the two halves are brought together in mating relation. A pin 106 is also mounted on each segment 88 and is engageable with a cam 100 on an opposing coupling half as a stop means when two coupling halves are coupled together.

Referring now to FIGURE 3, it is to be noted that when two coupling halves 12 are brought together in mating relation, the O-rings 94 of each coupling half seal upon each other while the poppet valve member 36 remains seated so that air will be excluded from the mating faces of the coupling halves. It is also to be noted from FIGURE 5 that the segments 88 of one coupling half will be disposed between the cams 100 on an opposing coupling sleeve 96. Then when the sleeves 96 are rotated, the cams 100 of one sleeve will engage the cams 88a on the segments of an opposing sleeve (FIGURE 4) bringing the disc 82 of one coupling half into engagement with the disc 82 of an opposing coupling half to drive the inner body members 62 of each half back into a respective outer body member 14 thereby forcing the balls 68 to move down camfered cam surface 30 into the ball receiving groove 50 on a valve member 36 to lock the poppet valve in an open condition. The O-rings 94 first become squeezed together to exclude air and prevent leakage. Further travel of cams 100 on faces 89 cause inner body member 62 and valve member 36 to move in the direction of end 16. This causes balls 68 to move towards the center line of the coupling half 12 thereby moving valve member 36 at a faster rate than the movement of inner body member 62. Hence, valve member 36 snaps away from valve seat 86.

The pins 104 are located in such a manner that they will engage a respective detent receiving slot 90 when the sleeves have been rotated to the maximum high spot on their respective cams. The cam 100 will engage a pin 106 in an opposing segment to prevent overturning of the sleeve 96.

When the coupling halves 12 are uncoupled by rotating the sleeves 96, the poppet valve 36 will seat before the O-rings 94 on the discs 82 unseat thereby eliminating any possibility of air entering the line or of fluid spilling or leaking through the coupling member. Loosening one sleeve 96 while the other sleeve remains tightened seats one poppet valve 36 while the tightened sleeve 96 retains the structural connection of coupling 10. This permits using coupling 10 as a shut-off valve even though the separate coupling halves remain connected together. When the coupling halves 12 are disconnected, the valves 36 trap fluid in the lines to which they are connected. Thus, if a line carries an expensive fluid, none will be lost due to drainage from a disconnected hose.

While the particular neuter coupling with poppet valves herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:
1. A coupling member comprising:
an outer body member;
a valve member slidably mounted in said outer body member;
an inner body member encompassing a portion of said valve member and having a portion slidably mounted in said outer body member, said inner body member including a valve seat for said valve member;
resilient means mounted in said outer body member for biasing said valve member into seated engagement with said valve seat;
means for moving said inner body member within said outer body member; and
means for unseating said valve member when said inner body member is moved within said outer body member.
2. A neuter coupling member comprising:
an outer body member having first and second chambers mounted therein and an external shoulder;
a valve member slidably mounted in said first chamber and having a portion extending into said second chamber;
an inner body member encompassing said extended portion of said valve member in slidable engagement with said second chamber, said inner body member including a valve seat and an external shoulder;
resilient means mounted in said first chamber and biasing said valve member into engagement with said valve seat;

a sleeve member encompassing said outer body member, said sleeve member having means mounted in one end for engaging the shoulder on said outer body member and means mounted at its other end for engaging the shoulder on said inner body member when said valve member is seated on said valve seat; and means for unseating said valve when said inner body member is slid into said second chamber, thereby bringing the shoulder on said inner body member out of engagement with the means mounted on the other end of said sleeve.

3. The coupling member of claim 2 wherein said means for unseating said valve member comprises an annular groove on said valve member and means mounted on said inner body member for engaging said groove when said inner body member is slid into said second chamber.

4. A neuter coupling member comprising:

an outer body member having a fluid inlet port at one end, a first chamber at its other end, a second chamber intermediate said ends and an external shoulder;

a valve member slidably mounted in said second chamber and extending into said first chamber, said valve member having an open end in fluid communication with said inlet port, a closed end and a fluid outlet port intermediate said ends;

an inner body member encompassing the extended portion of said valve member and being slidably mounted in said first chamber, said inner body member having ball means mounted in one end, a valve seat mounted in its other end and an external shoulder;

means normally seating said valve member on said valve seat;

a segment encompassing a portion of said other end of said inner body member and extending beyond said valve seat; and a sleeve member encompassing said outer body member, said sleeve member engaging both of said shoulders when said valve member is seated on said valve seat, means on said segment for sliding said inner body into said first chamber; said ball means engaging said annular groove to unseat said valve member when said inner body member is slid into said first chamber, thereby bringing said shoulder of said inner body member out of engagement with said sleeve.

5. The neuter coupling member of claim 4 including an O-ring mounted in said other end of said inner body member encompassing said valve seat.

6. The coupling member of claim 4 including an O-ring encompassing said inner body member in sliding engagement with said outer body member.

7. The coupling member of claim 4 including a cam face mounted in said outer body member intermediate said chambers for camming said ball means into engagement with said annular groove when said inner body member is slid into said first chamber.

8. The coupling member of claim 4 wherein said sliding means comprises a cam face mounted on said segment, said cam face being engageable by a sleeve on a second coupling member to unseat said valve member by sliding said inner body member into said first chamber.

9. A neuter coupling for connecting pressurized fluid-carrying lines together comprising:

first and second outer body members, each body member having a fluid inlet port at one end, a first chamber at its other end, a second chamber intermediate said ends and an external shoulder;

a valve member slidably mounted in each of said second chambers, each of said valve members having an open end in fluid communication with an inlet port, a closed end, a fluid outlet port intermediate said ends, and an annular, ball receiving groove;

an inner body member encompassing each of said valve members in slidable engagement with a respective first chamber, each of said inner body members including ball means engageable with said annular ball receiving grooves when said inner body member is slid into said first chamber, and a valve seat;

means normally seating said valve member on said valve seat; and sleeve means mounted on each body member for connecting said body members together in mated relation, each of said sleeve means including a cam engageable with an opposing body member to move an inner body member into a respective first chamber to engage said ball means with said ball receiving grooves.

References Cited by the Examiner
UNITED STATES PATENTS

| 2,727,759 | 12/55 | Elliott | 251—149.6 XR |
| 2,819,914 | 1/58 | Eitner | 137—614.04 XR |

FOREIGN PATENTS

| 657,429 | 2/63 | Canada. |
| 703,466 | 2/54 | Great Britain. |

LAVERNE D. GEIGER, *Primary Examiner.*